Figure 1:
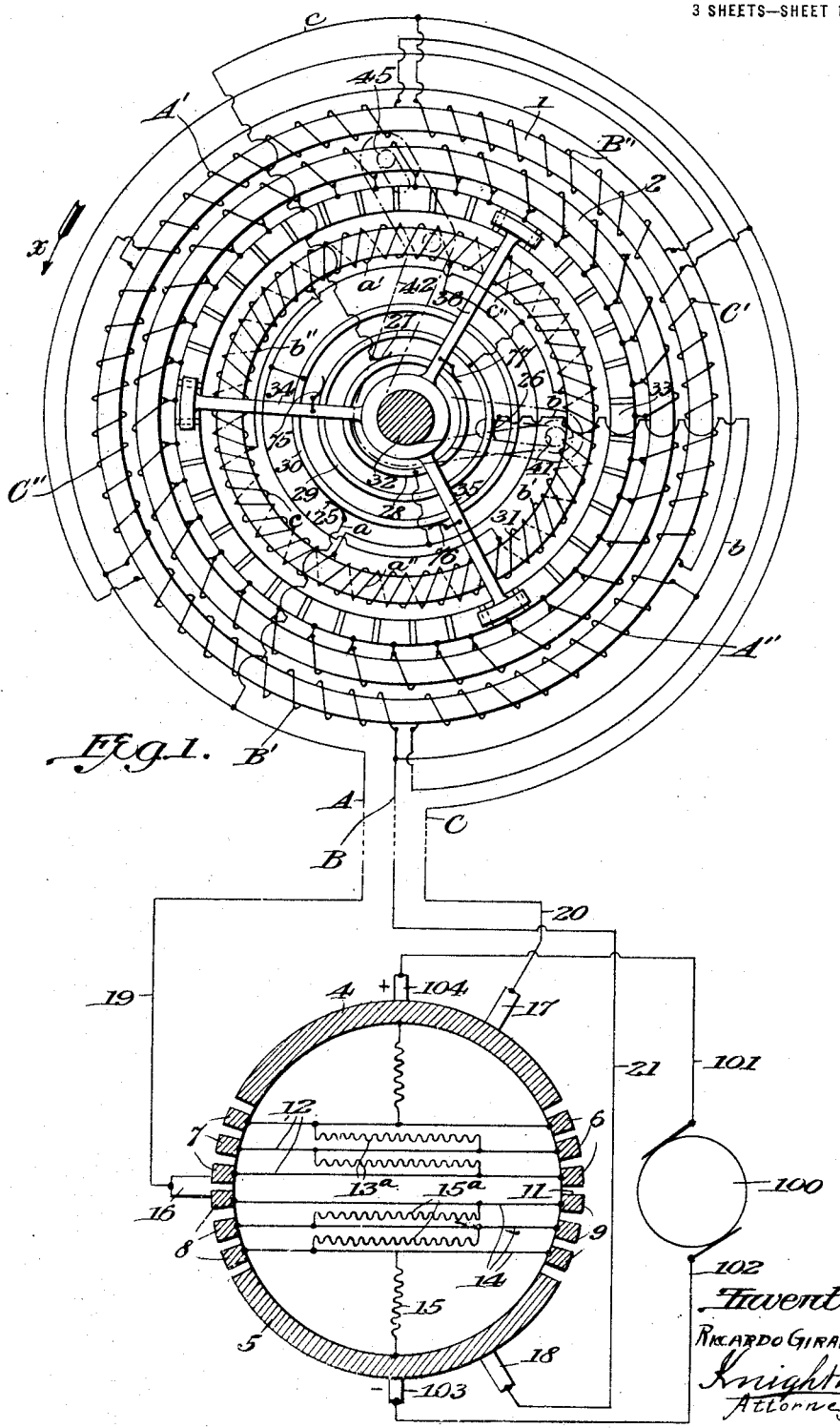

R. GIRARDELLI.
MOTOR WITH ROTATING FIELD FOR REPEATING ANGULAR MOVEMENTS AT A DISTANCE OVERCOMING GREAT RESISTANCE.
APPLICATION FILED SEPT. 24, 1910.

1,192,618.

Patented July 25, 1916.
3 SHEETS—SHEET 1.

Inventor:
RICARDO GIRARDELLI
Knight Bros
Attorneys

R. GIRARDELLI.
MOTOR WITH ROTATING FIELD FOR REPEATING ANGULAR MOVEMENTS AT A DISTANCE OVERCOMING GREAT RESISTANCE.
APPLICATION FILED SEPT. 24, 1910.

1,192,618.

Patented July 25, 1916.
3 SHEETS—SHEET 2.

R. GIRARDELLI.
MOTOR WITH ROTATING FIELD FOR REPEATING ANGULAR MOVEMENTS AT A DISTANCE OVERCOMING GREAT RESISTANCE.
APPLICATION FILED SEPT. 24, 1910.

1,192,618.

Patented July 25, 1916.

3 SHEETS—SHEET 3.

Witnesses:
C. Heymann
M. Schmid

Inventor:
Riccardo Girardelli
by B. Singer atty.

UNITED STATES PATENT OFFICE.

RICCARDO GIRARDELLI, OF ROME, ITALY.

MOTOR WITH ROTATING FIELD FOR REPEATING ANGULAR MOVEMENTS AT A DISTANCE OVERCOMING GREAT RESISTANCE.

1,192,618.           Specification of Letters Patent.     Patented July 25, 1916.

Application filed September 24, 1910. Serial No. 583,642.

*To all whom it may concern:*

Be it known that I, RICCARDO GIRARDELLI, a subject of the King of Italy, residing in the city of Rome and Kingdom of Italy, have invented certain new and useful Improvements in Motors with Rotating Field for Repeating Angular Movements at a Distance Overcoming Great Resistance, of which the following is a specification.

Devices are already known for repeating at a distance angular movements of any amplitude comprising a rotary current transmitter particularly designed for this purpose and connected to the rotating shaft whose movements must be repeated, and which, by means of a direct or of an alternating monophase current, can produce in a motor with which it is electrically connected, a rotating field followed in its displacement by the movable part of the motor, which latter thus repeats angles having any given ratio relative to those described by the commutator.

In the devices of this kind hitherto known has been experienced the inconvenience that in or near the position of rest, that is to say, when the direction of the field of the movable part coincides with the direction of the field of the fixed part, the turning moment vanishes totally or nearly totally and consequently, if the movable part of the motor is directly connected with parts that present even a scarcely noticeable resistance, it is not possible to obtain a perfect superposition of the two fields, but that they will form together an angle, which is the angle that corresponds to the turning moment capable of balancing the resistance of the driven part.

It follows that the indications thus obtained are erroneous, the error growing with the resistance to be overcome and the smallness of the angle by which the movable part of the motor is displaced every time, that is with the smallness of the angle which the direction of the field of the fixed part and the direction of the field of the movable part of the motor form between them when the movement is started. The error may therefore be reduced by increasing this initial angle, and for this purpose it has been proposed to make movable the directions of both the fields in the fixed as well as in the movable part of the motor.

By suitably arranging the winding of the rotor and of the stator it is possible to obtain that the direction of the field of one of them turns the same angle but oppositely to the field of the other, and that consequently the initial angular interval will be twice as large as that which is obtained in like devices under similar circumstances. However, it should be remarked that the initial angular interval between the directions of the two fields cannot exceed a certain limit, which is given by the number of the positions of rest of the rotor during a complete revolution; in fact if the rotor can take up $n$ different positions of rest, that is if the transmitter allows only $n$ different distributions of the current in the windings of the motor, at every passage from one position of rest to the successive one, the initial angle $\varphi$ between the directions of the two fields will amount to $\dfrac{360°}{n}$ in the case of the revolution of the rotor being effected through the displacement of a movable field rotating with respect to an invariable field, whereas it will amount to $2\,\dfrac{360°}{n}$ in the case of the revolution taking place through the simultaneous displacement of two fields rotating in opposite direction.

It is to be further remarked that if, as for instance when sighting guns, the driven shaft must be caused to rotate a large angle in a short time, while its direction must be controlled in a very accurate manner, it is necessary to have motors, the rotors of which may be able to take up a large number of positions of rest and in which consequently the value of the angle $\dfrac{2\times 360°}{n}$ and $\dfrac{360°}{n}$ is very small. If now the above-mentioned shaft is to turn a large angle, the motor field controlled by the distant transmitter must be rotated rather rapidly. In this case, especially when great resistances are to be overcome, it can easily happen that the rotor fails to follow the rotating field and lags behind putting the device out of adjustment.

As already stated hereinbefore, in such circumstances the employment of motors with many positions of rest is indispensable. But, as in these motors the initial angular interval of the two fields is too small, a current of considerable strength is required to overcome the resistance opposed by the driven shaft, that is to say for operating the device, powerful motors are necessary working with a great consumption of current and a limited efficiency, and causing comparatively high expenses of erection and operation, without succeeding in eliminating the inconvenience of the possible displacement caused by the great speed of revolution.

According to the present invention the aforesaid troubles are avoided by employing a motor, the rotor of which, being keyed upon the shaft intended to be rotated, turns an angle having a desired ratio to the angle which the direction of the field turns.

In order to understand how the rotor and the direction of its field may turn with a different rotating speed, it is to be kept in mind, that in a direct current motor, (in the movable portion of which the current is caused to pass through brushes sliding upon a commutator, and in consequence of the invariable position of the brushes in the gap), the direction of the field of the fixed portion of the motor always maintains the same position, while the direction of the field continuously changes with respect to the windings of the above named movable portion, that is to say with the same speed but in opposite direction in the gap. The angle between the two directions remains consequently unchanged and the movable portion of the motor rotates continuously as long as the current circulates therein.

In the motors which serve for transmitting angular movements it is, on the contrary, necessary that the movable portion after having turned a given angle, stops and does not move any more although the current still circulates in the windings of the motor. For this purpose it is necessary to employ at the transmitting station, a special current transmitter which converts the ordinary continuous or alternating current into a polyphase current, which, by circulating in a polyphase winding, may be able to form a rotatable field, the direction of which varies only when the transmitter is rotated, and remains unchanged as long as the transmitter maintains the same position.

According to the present invention a transmission device is inserted between the rotor and the brushes which, causes the brushes to turn the whole initial angle while the rotor moves forward an angle $$\frac{1}{2}\alpha = \frac{360°}{n}$$

or an angle $$\alpha = 2\frac{36}{n}$$

respectively, which angle therefore may have any desired value.

Figure 2:
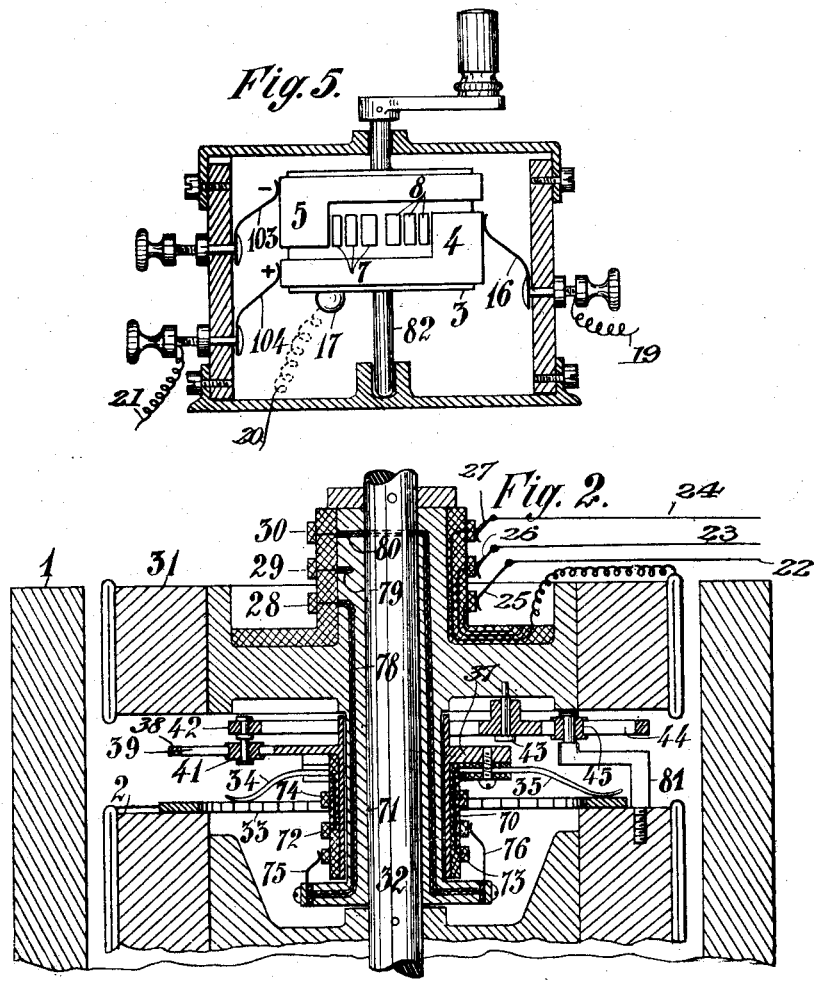
Figure 3:
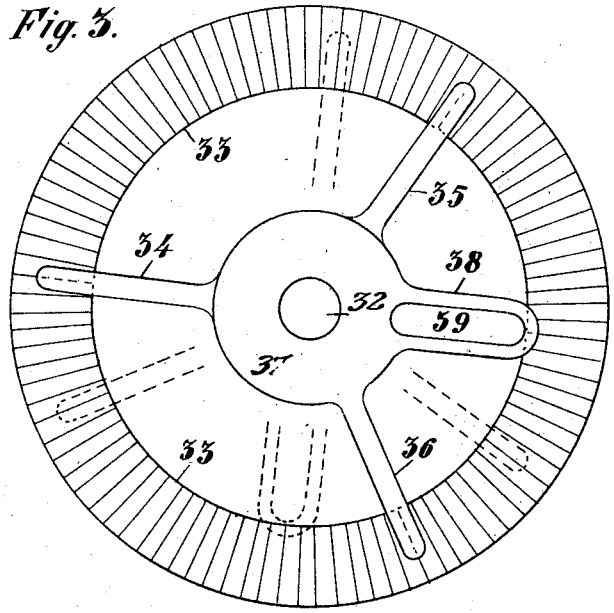
Figure 4:
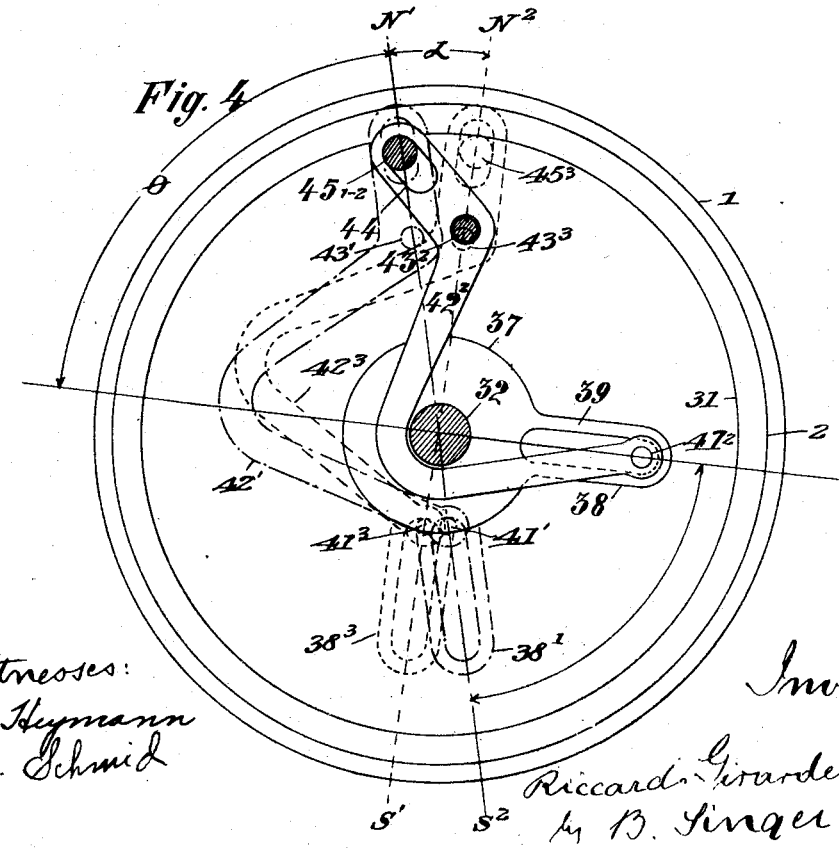

In the annexed drawings one embodiment of the motor according to the present invention is illustrated and Figure 1 shows diagrammatically the disposition of the windings of the motor having a main and an auxiliary rotor with equal and inverse deviation of the two fields and their connections with the transmitter at the transmitting station. Fig. 2 is a diametrical section of the constructional form of the motor with a main and an auxiliary rotor as schematically shown in the Fig. 1. Fig. 3 is a front view of the commutator of this motor with the brushes. Fig. 4 shows the connection between the auxiliary motor and the brush carrier. Fig. 5 is a cross sectional view of the rotary transmitter at the transmitting station.

The motor, Fig. 1, and Fig. 2, comprises a stator consisting of a ring shaped, smooth or slotted iron core —1— on which is arranged three phase windings A′ A″, B′ B″ and C′ C″, see Fig. 1, with the respective conductors A B C the phases of which are each formed by two coils and succeed one another in such a way that the resultant of the field is always diametrical. The phases of the rotor $a\ b\ c$ are also disposed on the ring —2— in such a way that the resultant of the field is diametrical. While, however the coils A′ B′ C′, and A″ B″ C‴ of the winding of the stator follow one another in the direction of the arrow —$x$—, the coils $a'\ b'\ c'$ and $a''\ b''\ c''$ of the winding of the rotor follow one another in the opposite direction, but instead of succeeding one another (in the two half rings) each occupying twice 60° as in the stator, they are overlapping and displaced 180° each phase comprising 120° so that the diametrical symmetry of the magnetization of the core is always obtained. With this arrangement, when the field of the stator turns, for instance 60° clockwise, the field of the rotor turns the same angle in the contrary direction and therefore the angle, which it must rotate in order to return into the position of rest, is twice as large as the angle which its field has been rotated. Multipolar winding may of course also be used for the motor, in such case, the angle of deviation will depend on the number of poles.

The rotation of the field may be obtained in any suitable manner as for instance by means of the rotary current transmitter illustrated in Figs. 1 and 5. On an insulating cylinder —3— are provided two metallic arcs —4— and 5 of 120°+ε and four series of contacts —6—7—8—9— each of the width ε, insulated from one another. The groups —6—7 which follow the ends of the arc —4— are separated from the groups —8—9 which follow the ends of the arc —5— by means of insulating intervals —10—11— each of which also occupies an angle ε. Each contact of the group —6— is connected to a contact of the group —7— by means of a wire —12. Resistance —13— connects the arc —4— with the first of the wires —12— and other resistances $13^a$, Fig. 1, form interconnection between the wires —12—. The wires —14— and the resistances —15—$15^a$ are disposed in a similar way between the arc —5— and the groups of contacts —8—9—.

A generator —100— supplies either direct or alternate monophase current to the metallic arcs —4—5— of the transformer by means of the wires —101—102— ending with the brushes —103—104.

Against the arcs —4—5— and the four groups of interposed contacts rest three brushes —16—17—18— which by means of wires —19—20—21— send the current in the phases A' A'', B' B'', C' C'' of the stator and by means of leads —22—23—24— ending with brushes —25—26—27— carry the current to the rings —28—29—30— provided on the hub of the auxiliary rotor —31—. Instead of being in shunt the two windings of the rotor and of the stator may also be in series as it is for instance shown in the case of the motor of Fig. 6 and Fig. 10, which will be explained hereinafter.

The auxiliary rotor —31— is mounted loose on the shaft —32— on which is keyed the main rotor 2 that carries on its front a commutator —33— on which slide the brushes —34—35—36— fastened to the brush holder —37—, see Figs. 2 and 3.

The current passes from the contact rings —28—29—30— to the brushes —34—35—36 in the following manner: The brush holder —37— is carried by a sleeve —70— which is mounted loosely on the hub —71— of the auxiliary rotor 31 and is provided with three contact rings —72—73—74—, electrically connected respectively with one of the brushes —34—35—36— and against which rest three other brushes —75—76—77— carried by the hub —71— of the auxiliary rotor 31. Three conductors —78—79—80— passing through the hub —71— connect the rings —28—29—30— with the brushes —75—76—77—.

Now the brush holder —37— is provided with an arm —38— having a slot —39— as shown also in Fig. 4. In this slot plays the roller —41— projecting from one end of a two-armed lever —42— swinging around a pivot —43— carried by the auxiliary rotor and of which the other end has another slot —44 in which can slide a pin —45— carried by an arm —81—, fastened to the main rotor 2.

The working of the device will now be clearly understood. The three brushes —16—17—18— of the transmitter at the transmitting station are in contact with the arcs 4, 5 carried by the rotatable shaft —82— the movements of which are to be repeated. In Fig. 4, the different positions of arm 38 and lever 42 are indicated in dotted lines by $38^1$, $42^1$ and $38^3$, $42^3$. The two arcs —4—5— are in communication with the two poles of the generator —100—. As the contacts change, on the turning of the cylinder —3— the three brushes change the intensity of the current of the diverse phases A' A'', B' B'', C' C'' and $a'$ $a''$, $b'$ $b''$, $c'$ $c''$ and therefore also the field in the rotor and the stator turning in inverse directions; the positions which the field of the stator assumes are equal in number to the diverse distributions of current in its phases; by varying the number of contacts, that is to say, the value of the angle ε, the angle which the rotor turns at every change of contact can also be varied.

The rotation is first accomplished by the auxiliary rotor 2 by means of current from the leads 22, 23 and 24 running over the winding provided on the rotor, which rotor must not overcome any resistance. This rotor carrying the pivot —43— of the lever —42— held by the pin —45—, which enters into the slot —44—, compels the lever to swing and the brush holder —37— to rotate with it actuated by the roller —41—, which slides in the slot —39—, the brushes of the holder leading a current to the main rotor. By this rotation the angle between the direction of the field of the main rotor and of the stator increases and when this angle has reached the amplitude at which the turning moment may overcome the resistance of the driven shaft, the main rotor starts rotating and trying to catch up with the auxiliary rotor. In this movement the direction of its field again approaches that of the stator, but still lags farther away than the direction of the field of the auxiliary rotor, and for this reason is subject to a stronger torque. It will suffice to arrange the motor in such a manner that the resulting angle between the two directions of the fields at the end of the movement is always below the highest allowable error, in order that the said errors should not in any case be reached.

In order to better explain the whole process, reference is to be had to Fig. 4, in which the three circles 1—2—31— represent the stator, the main rotor and the auxiliary rotor respectively. Moreover it is assumed that in the position of rest the lever —42— takes up the position —42′— shown with dotted lines. Now if at the passing of the brushes —16—17—18— from one contact to the other in the transmitter the direction of the field in the stator is caused to advance an angle $\frac{1}{2} \alpha$, while the direction of the field in the rotors is turned backward the same angle, the angle between the direction $N^2$—$S^1$ of the field of the auxiliary rotor and the direction $N^1$—$S^2$ of the field of the stator amounts totally to $\alpha$, that is to say the auxiliary rotor will be compelled to advance the said angle, and the pivot —43— from the position —43$^1$— on the line $N^1$—$S^2$ will pass into the position —43$^2$ on the line $N^2$—$S^1$. Further assuming that the main rotor —2—, and consequently the pin —45— carried by the same, has stopped, the lever —42— is compelled to take up the position —42$^2$— indicated by full lines, and by means of its roller —41— sliding in the slot —39— of the arm —38— of the brush-holder —37— the latter is caused to turn an angle θ, while the roller —41— abandoning the position —41$^1$— takes up the position —41$^2$—. But the brushes —34—35—36— are also similarly turned the same angle θ, consequently also the direction $N^1$—$S^2$ of the field of the main rotor takes up the position $xy$.

It will be understood that by suitably shaping the lever —42— and disposing the journals —41—43—45— the angle θ may be increased at will, independently from the value of the angle $\alpha$, as it is shown in Fig. 4, which refers to the case, in which a rotation of the field of the stator $$\tfrac{1}{2}\alpha = 7° \ 30'$$

corresponds to an angle θ 75°, so that with an initial angle $$θ + \alpha = 90°$$

and consequently at the beginning of the movement of the main rotor the motor develops the highest driving torque.

While the main rotor —2— turns an angle $\alpha$ and brings the pin —45— from the position —45$^2$— on the line $N^1$—$S^2$ in the position —45$^3$— on the line $N^2$—$S^1$, it thus also causes the lever —42— to turn around the pivot —43—, which now stops in the position —43$^2$—, so as to compel the brush-holder —37— to turn an angle θ+$\alpha$ in such a manner that the direction $xy$ of the field of the main rotor at the end of the operation coincides again with the common direction $N^2$—$S^1$ of the field of the stator and of the auxiliary rotor, passing through the axes of the journals 41—43 in the same way as at the commencement of the movement.

I claim:

1. In motors for repeating angular movements at a distance the combination of a polyphase winding, a reëntrant winding, a commutator provided on that part of the motor which carries the reëntrant winding, brushes sliding against said commutator, and a movable brush holder for said brushes, means establishing connection between the motor shaft and the brush holder in such manner that the brush holder is rotated with a different angular speed simultaneously with the motor shaft, so that the angle with which the rotor advances is different from the angle with which the direction of the polyphase field is rotated; said means comprising an intermediary member having positive connection with the part carrying the polyphase winding and also with the brush holder.

2. In motors for repeating angular movements at a distance the combination of a stator, a main rotor, an auxiliary rotor mounted on the shaft of the main rotor, a commutator on the main rotor, brushes sliding on the commutator of the main rotor, a holder for said brushes, and connections between the brush holder and the auxiliary rotor, said connections being arranged in such a manner that on rotating the auxiliary rotor the brush holder turns the brushes into the position in which the driving torque acting on the main rotor has the highest value; said means comprising an intermediary member having positive connection with each of the rotors and also with the brush holder.

3. In a motor having a stator, a main rotor with a commutator and an auxiliary rotor for the transmission of angular movements, a pin secured to the auxiliary rotor, a two armed lever mounted to rotate on said pin, one arm of said lever being provided with a slot, the brush holder with brushes sliding on said commutator, an extension on the brush holder, a roller mounted on the main rotor and engaging in said slot, a pivot on the other arm of the lever projecting into an opening in said extension of the brush holder in such a manner that, on starting the auxiliary rotor, the brush holder is rotated, thereby increasing the angle between the direction of the field of the main rotor and the stator, subsequently starting the main rotor whereby the brush holder is rotated so as to diminish the angle between the direction of the field of the main rotor and the stator.

In witness whereof I have set hereunto my hand this 10th day of September, 1910.

RICCARDO GIRARDELLI.

Witnesses:
LATERNO GUISEPPE,
ANTONIO LOBOCCETTA.